United States Patent [19]

Hayden et al.

[11] Patent Number: 5,674,462
[45] Date of Patent: Oct. 7, 1997

[54] METHOD FOR THE REMOVAL OF NON-METAL AND METALLOID HYDRIDES

[75] Inventors: Richard A. Hayden; Thomas M. Matviya, both of Pittsburgh, Pa.

[73] Assignee: Calgon Carbon Corporation, Pittsburgh, Pa.

[21] Appl. No.: 279,783

[22] Filed: Jul. 25, 1994

[51] Int. Cl.$^6$ ................................................ B01D 53/34
[52] U.S. Cl. .................................... 423/210; 210/660
[58] Field of Search ............................ 423/210; 210/660

[56] References Cited

U.S. PATENT DOCUMENTS

| | | | |
|---|---|---|---|
| 1,519,470 | 12/1924 | Wilson et al. | 423/210 |
| 3,755,193 | 8/1973 | Luft et al. | 429/218 |
| 3,833,498 | 9/1974 | Stahfeld | 423/210 |
| 3,909,449 | 9/1975 | Nagai et al. | 423/213.2 |
| 3,926,590 | 12/1975 | Aibe et al. | 423/244.03 |
| 4,532,115 | 7/1985 | Nishino et al. | 423/210 |
| 4,578,256 | 3/1986 | Nishino et al. | 423/210 |
| 4,772,455 | 9/1988 | Izumi et al. | 423/210 |
| 4,812,291 | 3/1989 | Friemel et al. | 422/28 |
| 5,352,370 | 10/1994 | Hayden | 423/244.09 |

FOREIGN PATENT DOCUMENTS

| | | | |
|---|---|---|---|
| 2517378 | 10/1976 | Germany. | |
| 61-118117 | 6/1986 | Japan | 423/210 |
| 62-213822 | 9/1987 | Japan | 423/210 |

OTHER PUBLICATIONS

J. Wang, et al. "An Appraisal of the Surface Chemistry and Catalytic Oxidative Ability of Nitrogen–Modified Activated Carbon . . . ", Cuihva Xuebao, vol. 10, #4, pp. 357–364 (1989).

Boehm, H.P; et al. "Activation of Carbon Catalysts for Oxidation Reactions . . . ", Journal de Chimie Physique, vol. 84, pp. 1449–1455 (1987).

Tanada, S., et al. "Preparation of Narrow Pores Carbon Suitable for Hydrogen Sulfide Absorption", J. Environ. Sci. Health, vol. A 20, #1, pp. 87–96 (1985).

The Absorption and Subsequent Oxidation of AsH, and PH on Activated Carbon, Journal of Crystal Growth 92 (1988) 189–195, North–Holland Amsterdam, J.M. Colabella, R.A. Stall, and C.T. Sorenson.

Sorption of Phosphine by Activated Carbon Cloth and the Effects of Impregnation with Silver and Copper Nitrates and the Presence of Water, Carbon vol. 23, No. 4, pp. 353–371, 1985, P.G. Hall and P.M. Gittins & J.M. Winn and J. Robertson.

An Evaluation of Impregnated Respirator Canister Carbons for Phosphine Removal from Air, Pestic. Sci. 1974, 5, 245–249, M. Muthu, T.S. Krishnamurthy and S.K. Majumder.

*Primary Examiner*—Steven Bos
*Assistant Examiner*—Peter DiMauro
*Attorney, Agent, or Firm*—Titus & McConomy

[57] ABSTRACT

A method is provided for the removal of metalloid and non-metal hydrides from gas or liquid media. The improvement is provided by the use of a high-temperature carbonaceous char derived from a carbonaceous feedstock which has been exposed to nitrogen-containing compounds at temperatures above 700° C. In the preferred embodiment of the method, the high-temperature carbonaceous char is prepared by carbonizing and oxidizing a bituminous coal at temperatures less than 700° C followed by exposure to urea, ammonia, or nitrogen-containing compound as the temperature is raised to above 700° C.

20 Claims, No Drawings

METHOD FOR THE REMOVAL OF NON-METAL AND METALLOID HYDRIDES

FIELD OF THE INVENTION

The present invention relates to a method for the removal of non-metal and metalloid hydrides from gas and liquid media.

BACKGROUND OF THE INVENTION

Non-metal hydrides, such as phosphine, and metalloid hydrides such as arsine and germane, can occur as unwanted constituents in a number of gas or liquid process streams. These materials are highly toxic and can present a severe personal and environmental hazard even at concentrations of less than a few parts-per-million.

These hydrides are used directly in large quantities as dopants in the manufacture of semi-conductor materials. Other uses include their use as fumigants and biocides in various agricultural applications. They may also arise as unwanted contaminants in other process streams where their use per se is unintended. For example, in the processing of various metals, arsine and phosphine fumes may arise in the process off-gases due to the presence of trace amounts of arsenic and phosphorus in the unrefined metals.

Many methods are known in the art for the removal of such hydrides from process streams in which their presence is undesirable. One method of removal involves the use of chemical scrubbing. Since most of these hydrides are susceptible to oxidation according to the general reaction

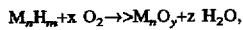

$$M_nH_m + x\ O_2 \rightarrow M_nO_y + z\ H_2O,$$

contact of the hydride-containing process stream with chemical oxidants can provide an effective means of hydride removal. However, the practice of using such direct chemical scrubbing is often expensive and inconvenient. In most cases such processes require continuous addition of the chemical oxidant to the hydride stream and continuous monitoring of chemical dose rates as a function time to account for changes in inlet hydride concentrations. Therefore, operating costs are generally high. Additionally, constant vigilance and maintenance is required in the operation of such systems to ensure that operational upsets do not occur.

Another method of removal involves the adsorption of the hydride on a porous material such as activated carbon. Adsorption systems are inherently more convenient to operate since they usually require very little maintenance and no chemical additions. For this reason their use may be preferred where they can be made to be economically viable.

Where oxygen or another oxidant is absent in the carrier matrix, the adsorption of a hydride on an activated carbon is usually physical in nature, preserving the chemical identity of the hydride. However, the physical adsorption capacities of some hydrides is limited, requiring large amounts of activated carbon for their effective removal by physical adsorption alone. If the hydride can be converted chemically into a compound which adsorbs more strongly on the carbon surface, removal of the hydride can be enhanced. For example, the presence of an oxidant such as oxygen may allow conversion of the hydride into the corresponding oxide which is much more strongly adsorbed by the carbon. Even then, the rate and extent of conversion of the hydride may be insufficient. To obtain satisfactory performance in such cases, it has usually been necessary to impregnate activated carbons with transition metals such as copper and silver. Such metals are highly active for the removal of hydrides from gas streams such as air. However, activated carbons impregnated in this manner also possess several inherent disadvantages which may limit their overall utility. These disadvantages include the high costs of some impregnants such as silver, lowered carbon ignition temperatures, impregnant toxicity and attendant disposal limitations, and diminished ability to regenerate or reactivate the spent carbon once it has become exhausted for hydride removal. The added metals may also occupy adsorption pore volume that is now lost for the physical adsorption of other compounds which may also be present in the process stream and require removal.

Accordingly, it is the object of the present invention to provide a method for the enhanced removal of metalloid and non-metal hydrides, in particular the hydrides of phosphorus, arsenic, antimony, selenium, tellurium, silicon, germanium, and boron, by a carbon or carbonaceous char which does not require the addition of transition metals applied to the carbon surface in a post-treatment step. It is further the object of the present invention to provide a carbon or carbonaceous char which is intrinsically active for hydride removal apart from factors such as Apparent Density, contact time, mean particle diameter, and the like which impact the physical adsorption capacity of the char, and without significantly affecting the adsorption properties of the char.

SUMMARY OF THE INVENTION

Generally, the present invention comprises a method for the removal of metalloid and non-metal hydrides from gas and liquid media such as air, in the presence of an oxidant such as oxygen, by contacting said media with a nitrogen-treated carbon or carbonaceous char. In those instances where the products of the removal of the hydride are water-soluble, the spent carbon or char may be regenerated simply by washing the spent char with water. The recovered products may then be reclaimed for additional uses or disposed of in an environmentally-acceptable manner.

In those instances where the products are not water-soluble, any other suitable solvent may be used provided this solvent can be conveniently removed from the carbon surface after contact with the spent carbon. Additional recovery of the initial hydride removal capacity of the carbon may be achieved by reactivating the spent carbon. Reactivation is generally accomplished by heating the spent carbon to high temperatures, typically above about 700° C., in the presence of one or more of an inert gas, steam, carbon dioxide or oxygen. To avoid the appearance of excessive amounts of reduced non-metals or metalloids in the reactivation off-gasses, regeneration is carried out prior to high-temperature reactivation. Reactivation is recommended in those instances where adsorbable organics or other materials which poison the sites specific for hydride removal gradually diminish the activity of the carbon after each regeneration cycle until a point is reached where the carbon can no longer function effectively.

In one embodiment of the present invention, an oxidant-containing process stream such as air, containing a hydride such as phosphine, is contacted with a carbonaceous char which has been previously exposed at temperatures above about 700° C. to a nitrogen-containing compound such as urea. Alternatively, the process stream can be contacted with a carbonaceous char which has been previously derived from a nitrogen-rich feedstock such as polyacrylonitrile, polyamide, or any of a variety of organic amines. In both such embodiments, the resultant char can be activated at high temperatures, typically above 700° C., with any of steam, carbon dioxide, or oxygen to impart suitable transport and adsorption properties to the char prior to its contact with the process stream. These properties may vary depending on the conditions of a particular application. After the desired exposure to the hydride-containing stream, the spent char may then be regenerated by washing it with a suitable solvent such as water. If the performance of the char after regeneration is no longer acceptable, the char may be additionally reactivated at high temperatures, typically above 700° C., to restore its hydride-removal capacity.

In a particularly preferred embodiment of the present invention the char which is contacted with the hydride-containing process stream is prepared by the low-temperature carbonization and extensive oxidation of a nitrogen-poor carbon feedstock. The material which results from the carbonization and oxidation process is then subjected to a nitrogen-containing compound such as urea as the temperature is raised to above 700° C to produce a high-temperature carbonaceous char. In all cases, high-temperature carbonaceous chars are those produced by thermal treatment at temperatures greater than 700° C. Low-temperature carbonaceous chars are those which have not experienced temperatures greater than 700° C.

The preferred nitrogen-poor carbon feedstock is a bituminous coal or a material having bituminous properties such as those derived from higher or lower rank bitumens, coals, or lignocellulose materials by various chemical treatments ("bituminous-materials"). Examples of higher rank coals include anthracite or semi-anthracite coals, while examples of lower rank coals include peat, lignite, and sub-bituminous coals. Examples of the chemical treatment of these feedstocks include alkali metal treatment of the high rank materials and zinc chloride or phosphoric acid treatment of the low rank materials. These types of treatments can also be applied to lignocellulose materials.

In the particularly preferred embodiment of this invention, the feedstock material is pulverized, mixed if necessary with small amounts of a suitable binder such as pitch, briquetted or otherwise formed, and sized. The sized material is then extensively oxidized at temperatures less than 700° C., preferably less than 400° C. The oxidation is continued until additional gains in the catalytic activity of the final product are no longer evident. The oxidation is well beyond that typically required to remove the coking properties of bituminous coals and produces an optimally oxidized char. Other convenient means of oxidation can also be used to effect the low-temperature oxidation and carbonization of the starting material.

The oxidized low-temperature carbonaceous char is then exposed to small amounts of an inexpensive, abundant, and relatively non-toxic nitrogen-containing compound such as urea, ammonia, melamine or any other nitrogen-containing compound in which at least one nitrogen functionality has a formal oxidation number other than zero. The amounts of nitrogen-containing compounds used are typically small, preferably less than 5% by weight of the oxidized low-temperature carbonaceous char or such that additional gains in the catalytic activity of the final product are no longer evident. The heating is preferably conducted under an atmosphere that is inert except for the gases and vapors attributable to the char and/or the nitrogen-containing compounds. The heating rates and temperatures are preferably selected such that additional gains in the catalytic activity of the final product are no longer evident.

The resultant nitrogen-treated high-temperature carbonaceous char may then be activated to the desired density at temperatures above 700° C. in steam and/or carbon dioxide, with or without the addition of other gasifying agents such as air. The activated char is then cooled in an oxygen-free or otherwise inert atmosphere to temperatures less than 400° C., preferably less than 100° C. Additional gains in hydride-removal activity may be realized by repeating any or all of the aforesaid steps as many times as may be desired. Alternatively, any other known method in which a carbonaceous char is treated with nitrogen-containing compounds at high temperatures may be applied to the resultant product to further enhance its activity.

PRESENTLY PREFERRED EMBODIMENTS

The following examples illustrate the practice of the present invention. Example 1 provides a representation of prior art practices, while Example 2 provides a representation of the preferred embodiment of the present invention. Comparison of the results of Example 1 to those of Example 2 clearly shows the advantage achieved by the present invention.

EXAMPLE 1

A one-inch diameter column was filled to a depth of twelve inches with BPL carbon (Calgon Carbon Corporation, Pittsburgh, Pa.). BPL carbon is a commercially-available bituminous coal-based activated carbon. The particular sample used for this experiment was screened to a strict 4×6 mesh (U.S. Standard Series Sieve) and had an Apparent Density (Test Method TM-7, Calgon Carbon Corporation, Pittsburgh, Pa.) of 0.507 grams per cc. A 50% relative humidity nitrogen stream containing 200 ppm phosphine and 500 ppm oxygen was then passed upflow through the column at a flow velocity of 50 feet per minute. The phosphine concentrations of the effluent from the column were then measured. After 8 hours of operation the phosphine concentration in the effluent from this column measured 88 ppm. The percentage of phosphine removed equalled 56%.

EXAMPLE 2

Bituminous coal was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was carbonized and oxidized at temperatures between about 250° C. and 450° C. for at least 3 hours. The resultant oxidized char was cooled to near ambient temperatures and subsequently impregnated with an aqueous urea solution and dried. The quantity of urea solution used was sufficient to produce a 2–4% urea loading on a dry weight basis. The impregnated, oxidized char was then heated to about 950° C. in a furnace and maintained at that temperature for up to 1 hour. Immediately following this treatment the material was contacted with steam, while maintaining a 950° C. temperature, for a period of time sufficient to achieve an Apparent Density (Test Method TM-7, Calgon Carbon Corporation, Pittsburgh, Pa.) of about 0.51 grams per cc for a 4×6 mesh (U.S. Standard Series sieves) particle size distribution. After gasification, the material was cooled to ambient temperature under an inert atmosphere. The nitrogen-treated carbon produced by this procedure was then screened to a strict 4×6 mesh. The Apparent Density of this material was determined to be 0.514 grams per cc.

A one-inch diameter column was filled to a depth of twelve inches with the carbonaceous char prepared as described above. A 50% relative humidity nitrogen stream containing 200 ppm phosphine and 500 ppm oxygen was then passed upflow through the column at a flow velocity of 50 feet per minute. The phosphine concentrations of the effluent from the column were then measured. After 8 hours of operation the phosphine concentration in the effluent from this column measured less than 2 ppm. The percentage of phosphine removed was greater than 99%.

While the presently preferred embodiments of the invention have been described in particularity, they may be otherwise embodied within the scope of the appended claims.

What is claimed is:

1. A method for the removal of hydrides of phosphorus, arsenic, antimony, selenium, tellurium, silicon, germanium, or boron, either singly or in any combination thereof, from a gas or liquid media containing an oxidant, said method comprising contacting the said media with a carbonaceous char containing no impregnated transition metals, which has been prepared prior to contacting said media by (1) carbonizing a bituminous coal at temperatures less than 700° C. in the presence of an oxidizing agent (2) oxidizing said bituminous coal at temperatures less than 700° C. during or after said carbonization, and (3) contacting said carbonized and oxidized bituminous coal with at least one nitrogen-containing compound and during or after contacting of said carbonized and oxidized bituminous coal with said nitrogen-containing compound increasing the temperature to at least 700° C. to produce said carbonaceous char.

2. A method as set forth in claim 1, wherein said nitrogen-containing compound is selected from the group consisting of one or more of ammonia, urea, melamine, and any other nitrogen-containing compound in which at least one nitrogen functionality has a formal oxidation number other than zero.

3. A method as set forth in claim 1 wherein said carbonaceous char is cooled to temperatures less than 400° C., in an oxygen-free or otherwise inert atmosphere after exposure to temperatures greater than 700° C.

4. A method as set forth in claim 1 wherein, additionally, said carbonaceous char has been activated by contacting said char with at least one of $H_2O$, $CO_2$, and $O_2$ at temperatures equal to or greater than 700° C.

5. A method as set forth in claim 4 wherein said carbonaceous char is cooled to temperatures less than 400° C. in an oxygen-free or substantially inert atmosphere following said contacting of said char with at least one of $H_2O$, $CO_2$, and $O_2$ at temperatures equal to or greater than 700° C.

6. A method as set forth in claim 1 wherein said oxidant is oxygen.

7. A method as set forth in claim 1 wherein said oxidizing agent is oxygen.

8. A method for the removal of hydrides of phosphorus, arsenic, antimony, selenium, tellurium, silicon, germanium, or boron, either singly or in any combination thereof, from gas or liquid media containing an oxidant, said method comprising contacting the said media with a carbonaceous char, said char containing no impregnated transition metals and having been prepared prior to contacting said media by exposing a nitrogen-poor carbonaceous feedstock, having a total nitrogen content of less than 5% by weight, to nitrogen-containing compounds at temperatures equal to or greater than 700° C. to produce said carbonaceous char.

9. A method as set forth in claim 8 wherein said nitrogen-containing compounds are selected from the group consisting of one or more of ammonia, urea, melamine, and any other nitrogen-containing compound in which at least one nitrogen functionality has a formal oxidation number other than zero.

10. A method as set forth in claim 8 wherein said carbonaceous char is cooled to temperature less than 400° C. in an oxygen-free or substantially inert atmosphere following said exposure to nitrogen-containing compounds at temperatures equal to or greater than 700° C.

11. A method as set forth in claim 8, wherein additionally, said carbonaceous char has been activated by contacting said char with at least one $H_2O$, $CO_2$, and $O_2$ at temperatures equal to or greater than 700° C.

12. A method as set forth in claim 11 wherein said carbonaceous char is cooled to temperatures less than 400° C. in an oxygen-free or otherwise inert atmosphere after activation at temperatures greater than 700° C.

13. A method as set forth in claim 8 wherein the said oxidant is oxygen.

14. A method for the removal of hydrides of phosphorus, antimony, selenium, tellurium, silicon, germanium, or boron, either singly or in any combination thereof, from a gas or liquid media containing an oxidant, said method comprising contacting said media with a carbonaceous char, said char containing no impregnated transition metals and having been prepared prior to contacting said media by carbonizing a nitrogen-rich carbonaceous feedstock, having a total nitrogen content of greater than 5% by weight, at temperatures equal to or greater than 700° C. to produce said carbonaceous char.

15. A method as set forth in claim 14 wherein said nitrogen-rich carbonaceous feedstock is an organic compound or polymer containing amine, amide, nitrile, nitrosamine, cyanate, isocyanate, or oxime functional groups, exclusively or in any combination.

16. A method as set forth in claim 14 wherein said exposure to temperatures equal to or greater than 700° C. occurs in the presence of one or more additional nitrogen-containing compounds selected from the group consisting of ammonia, urea, melamine, and any other nitrogen-containing compound in which at least one nitrogen functionality has a formal oxidation number other than zero.

17. A method as set forth in claim 14 wherein the said carbonaceous char is cooled to temperatures less than 400° C. in an oxygen-free or substantially inert atmosphere following said carbonization at temperatures equal to or greater than 700° C.

18. A method as set forth in claim 14 wherein, additionally, said carbonaceous char has been activated by contacting said char with at least one of $H_2O$, $CO_2$, and $O_2$ at temperatures equal to or greater than 700° C.

19. A method as set forth in claim 18 wherein the said carbonaceous char is cooled to temperatures less than 400° C. in an oxygen-free or substantially inert atmosphere following said contacting of said char with at least one of $H_2O$, $CO_2$, and $O_2$ at temperatures equal to or greater than 700° C.

20. A method as set forth in claim 14 wherein the said oxidant is oxygen.

* * * * *